Jan. 2, 1934.  A. G. FORD  1,941,831

GAS SERVICE REGULATOR

Filed May 9, 1930

Witness
William P. Kilroy

Inventor
Albert G. Ford
by George I. Haight
Atty.

Patented Jan. 2, 1934

1,941,831

UNITED STATES PATENT OFFICE 1,941,831

GAS SERVICE REGULATOR

Albert G. Ford, Aurora, Ill.

Application May 9, 1930. Serial No. 450,918

6 Claims. (Cl. 50—25)

This invention relates to improvements in governors for gas distributing systems, and particularly to that type of governor known as a service governor which is generally installed in the supply line leading to the individual consumer.

In the distribution of gas to individual consumers it is the practice, particularly in the so-called high pressure systems, to employ service governors between the mains and the individual consumer lines.

The purpose of these governors is to supply the required quantity of gas at a predetermined reduced pressure to the individual consumer. The usual governor has a valve which controls the flow of gas from the mains to the consumer's pipe line, and a diaphragm device responsive to variations in pressure caused by a varying demand for gas, the governor functioning to maintain a constant low pressure on the delivery side and at the same time allow sufficient gas to flow to meet the demand. The normal demands, however, were not excessive, and the usual type of governor above mentioned functioned properly under the conditions.

With the advent of such gas-consuming appliances, such as house-heating plants, which require a relatively excessive quantity of gas, the character of the consumer demand changed. These gas-consuming appliances are intermittent in operation, and the load caused by their operation makes necessary a heavy flow of gas through the governor. The rush of gas under high pressure from the mains through the governor valve, however, sets up a violent turbulence of the gas in the diaphragm chamber and establishes a false pressure which is not representative of the pressure in the delivery or consumer's side of the governor. Hence, the attempt of the governor to increase the flow of gas in response to a pressure drop in the delivery side is opposed by the false pressures and turbulence of gas in the diaphragm chamber, with the result that the governor cannot function and its purpose is thereby defeated.

The object of this invention is to overcome these defects in the usual type of service governor by the provision of a structure, wherein the diaphragm chamber and diaphragm are not subjected to false pressures and turbulency of inrushing gas, but instead are made responsive to the pressure variations on the delivery side of the governor leading to the gas-consuming appliances.

Other objects of the invention will appear hereinafter.

Referring to the accompanying drawing.

Figure 1:
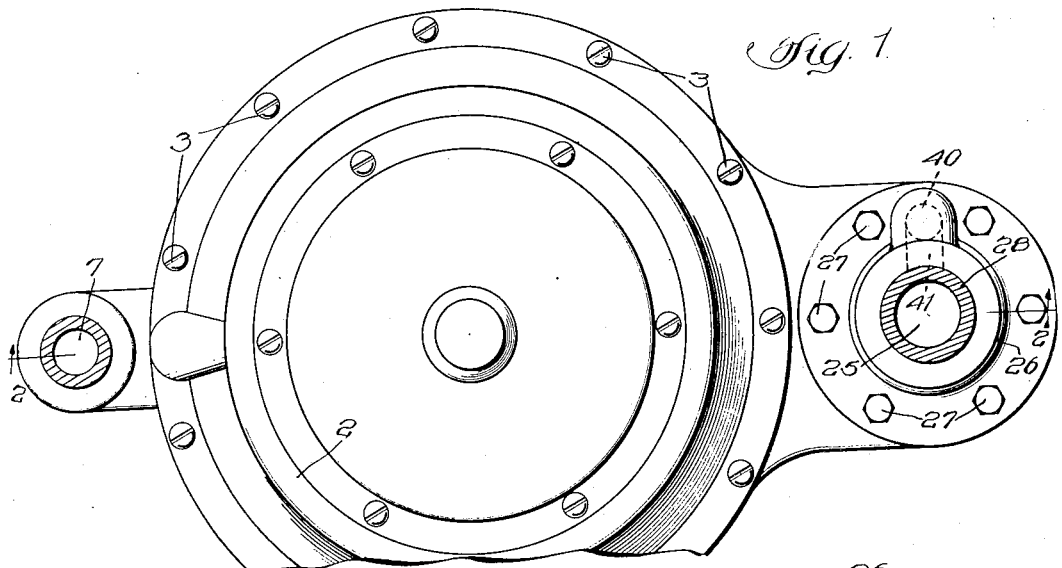
Fig. 1 is a top plan view of the service governor embodying the invention.
Figure 3:
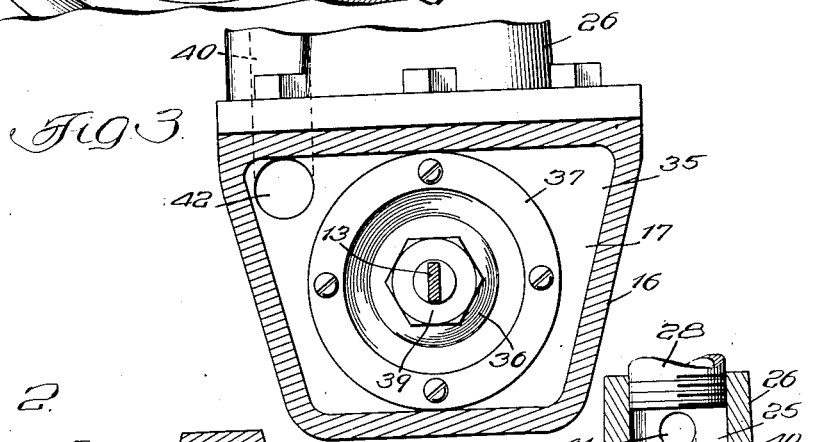
Fig. 3 is a transverse vertical section on the line 3—3 of Fig. 2.
Figure 2:
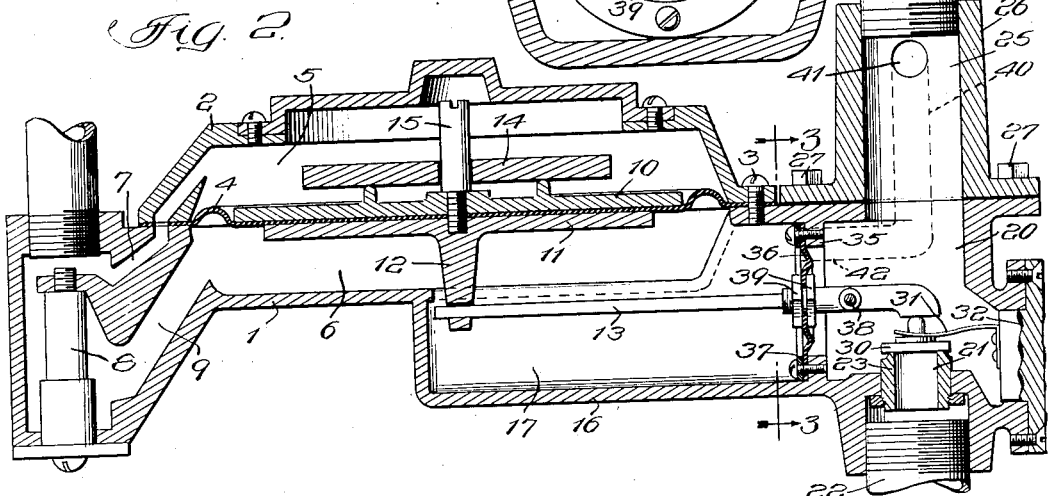
Fig. 2 is a central section on the line 2—2 of Fig. 1.

The governor shown in the drawing involves a circular housing comprising the body member 1 and a cover or cap member 2, separably fastened together by a series of screws 3. Between the body and cover member, a flexible diaphragm 4 is clamped, dividing the housing into two compartments or chambers 5 and 6. The upper chamber 5 is open to the atmosphere through the port 7, while the lower or diaphragm chamber is closed so as to be subject to gas pressure, as hereinafter described. A mercury safety seal 8, connected with the diaphragm chamber by the port 9, is provided. This mercury seal is of usual and well known construction and needs no further description.

The diaphragm 4 is usually made of leather clamped between upper and lower disc members 10 and 11. The lower disc member 11 has a depending arm 12 which is loosely connected to the valve operating lever 13 for operating said lever in accordance with the movements of the diaphragm. The upper disc is arranged to support one or more weights 14 centered on a pin 15 by means of which the governor may be weighted or loaded for the purpose of adjusting it to the usual predetermined pressure.

The body of the housing has an offset portion 16 which extends beyond the circular confines of the body. That portion of the extension 16 which is beneath the body has a chamber 17 directly in communication with and forming a part of the diaphragm chamber 6 and providing room for the operating lever 13. That portion of the extension 16 which projects beyond the body of the governor provides a valve chamber 20. The lower end of the valve chamber has a gas inlet 21 connected by suitable piping 22 with the source of gas supply, such as the high pressure main. The inlet 21 is formed by the usual orifice member 23 inserted in the lower wall of the extension. These orifice members can be of different size to regulate the capacity of the governor in accordance with the usual practice.

The outlet port 25 for the valve chamber is formed by a separable boss 26 fastened by the screws 27 to the extension 16 and connected to the piping 28 to the gas-consuming appliances, this outlet port connected to the gas-consuming appliances referred to as the delivery side of the governor. The inner end of the orifice member forms a seat for a disc valve 30 which is moved to and from the valve seat by the diaphragm through the valve lever 13 to regulate the flow of gas through the orifice and to govern the pressure on the delivery side of the governor. This valve is yieldably seated by a spring 31 bearing upon it, the spring being mounted on a removable cap 32 at the end of the extension 16, so that access may be had to the interior for the purpose of changing the orifice members.

The chamber 17 and the diaphragm chamber 6 are completely separated from communication with the valve chamber 20 by means of a partition wall 35 and a flexible diaphragm 36. The partition wall 35 has a circular opening which is covered by the diaphragm, the diaphragm being fastened to the wall by the clamping ring 37. The valve operating lever 13 is pivoted at 38 within the valve chamber 20, but it extends through and is fastened to the diaphragm 36 by means of jam nuts 39 between which the diaphragm is clamped to seal the joint between the diaphragm and valve lever. The diaphragm 36 is flexible so that it will not interfere with the movement of the valve lever 13, but at the same time will maintain complete separation between the valve chamber 20 and the diaphragm chamber, whereby gas cannot enter the diaphragm chamber from the valve chamber.

The diaphragm chamber instead communicates with the outlet port 25 on the delivery side of the governor, this communication being formed by a duct or passage 40. The passage is formed in the extension casting 16 and in the outlet boss 26. Its upper end port 41 opens into the outlet port 25, and its lower end 42 opens into the diaphragm chamber through the partition wall 35.

In gas-distributing systems in which this governor is used, gas pressure is delivered to the governor from the mains at the relatively high pressure of 40 to 60 pounds, and the governor reduces this pressure for delivery side to the equivalent of 4 or 5 inches of water column. Whenever a drop in pressure on the delivery side of the governor is caused by increased demand of gas-consuming appliances, this drop is communicated to the diaphragm chamber through the passage 40, and the diaphragm responds by lowering and opening the valve 30 to allow sufficient flow of gas to compensate for the drop in pressure. Although the heavy inrush of gas through the inlet orifice impinging on the valve creates a violent disturbance and turbulence of the body of gas surrounding the valve, these conditions do not affect the diaphragm. Instead, the gas passes directly through the valve chamber and outlet port 25 to the gas-consuming appliance. By the time, however, the gas reaches the outlet port, it will already have dissipated its violence and assumed a streamlike flow, and the pressure thereof represents the true pressure at which the gas is being delivered to the gas-consuming appliance. It is intended that the port 41 for the passage 40 be located far enough along the delivery pipe or outlet to be assured of its being located in a zone in which the gas is flowing in a streamlike condition, unaffected by the turbulence of the incoming gas.

It is to be understood that changes can be made in the construction, arrangement and operation of the parts, without departing from the scope and spirit of the invention, and I contemplate such changes as fairly fall within the scope of the appended claims.

I claim:

1. In a service governor of the class described, the combination of a housing having a diaphragm chamber and a valve chamber separated by a wall from said diaphragm chamber, said valve chamber having an inlet port and an outlet, a diaphragm in said diaphragm chamber, a valve for controlling the inlet port, a lever pivoted adjacent the wall and having one arm extending through the wall and connected to said diaphragm and its other arm connected with said valve, for operating said valve, and means for rendering the diaphragm responsive to pressure variations in said outlet, said means comprising a connection establishing communication between the valve chamber and the outlet at a point distant from said valve chamber.

2. In a service governor of the class described, the combination of a housing having a diaphragm chamber and a valve chamber, said valve chamber having an inlet port adapted for connection with a source of relatively high pressure gas and an outlet port adapted for connection to relatively low pressure gas-consuming appliances, a valve controlling said inlet port, a lever for operating said valve extending from the valve chamber into the diaphragm chamber and a flexible closure member through which said lever extends and arranged to completely seal said diaphragm chamber against the passage of gas from the valve chamber, a diaphragm in said diaphragm chamber connected to said lever for operating same, and means forming a passage connecting said diaphragm chamber with the connection to said gas consuming appliances.

3. In a gas service regulator of the class described, the combination of a housing having a diaphragm chamber and having an offset portion providing an auxiliary chamber communicating with said diaphragm chamber, a gas inlet at one end of said offset for connection with a source of high pressure gas, an outlet from the delivery side of said regulator adapted for connection with the gas consuming appliances operating at low pressure, a lever in said auxiliary chamber connected with said diaphragm, a flexible partition wall in said auxiliary chamber connected with said lever to permit the movement thereof, and separating said auxiliary chamber and said diaphragm chamber from communication with said gas inlet and outlet, a pressure-reducing valve for controlling the pressure of the gas from said inlet, said valve being connected to and operated by said lever, and means forming a gas passage connected at one end to said diaphragm chamber and at its other end to the connections for the gas-consuming appliances beyond the turbulent zone of gas through said inlet for transmitting the pressure from said distant point to the diaphragm chamber.

4. In a service governor of the class described, the combination of a housing having a diaphragm chamber and a valve chamber separated by a wall from said diaphragm chamber, said valve chamber having an inlet port and an outlet, a diaphragm in said diaphragm chamber, a valve for controlling the inlet port, a lever pivoted adjacent said wall and extending through the wall between the diaphragm and the valve for operating said valve, a flexible diaphragm connected with the wall and with said lever to seal said chamber against communication and permit movement of said lever, and means for rendering the diaphragm responsive to pressure variations in said outlet.

5. In a gas service regulator, the combination of a housing having a valve chamber and an adjacent main diaphragm chamber, said valve chamber having an inlet for connection with the source of high pressure gas and an outlet for connection with low pressure gas-consuming appliances, a main operating diaphragm in said diaphragm chamber, a valve controlling the admission of gas to said valve chamber, a pivoted lever having one arm extended to the valve and another arm extended to the main diaphragm, and a partition wall including a flexible sealing member for separating the diaphragm chamber from the valve chamber and disposed in a plane substantially at right angles to the plane of movement of said lever, said lever extending through said flexible sealing member and connected therewith.

6. In a gas service regulator, the combination of a housing having a main diaphragm chamber horizontally disposed and an independent valve chamber offset laterally with respect to said diaphragm chamber, said valve chamber having a gas inlet for connection with a source of high pressure gas and an outlet for connection with low pressure gas-consuming appliances, a valve in said valve chamber for controlling the admission of gas to said valve chamber, a main horizontally disposed operating diaphragm in said diaphragm chamber, means forming an independent passage for gas extending from said diaphragm chamber to a point in the outlet connections with said gas-consuming appliances remote from said valve chamber to subject the main diaphragm to pressure in said connections leading to the gas-consuming appliances, a valve operating mechanism within the housing extending from and substantially parallel with said main diaphragm and into said offset valve chamber for actuating said valve in response to pressure conditions in the connections to said gas-consuming appliances and a partition wall in said housing separating said offset valve chamber from communication with the diaphragm chamber, said valve operating mechanism extending through said separating wall.

ALBERT G. FORD.